United States Patent
Konishi et al.

(10) Patent No.: US 7,020,302 B2
(45) Date of Patent: Mar. 28, 2006

(54) SPEAKER, SPEAKER MODULE, AND ELECTRONIC EQUIPMENT USING THE SPEAKER MODULE

(75) Inventors: Shuhei Konishi, Osaka (JP); Kimihiro Ando, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 157 days.

(21) Appl. No.: 10/381,669

(22) PCT Filed: Sep. 26, 2002

(86) PCT No.: PCT/JP02/09926

§ 371 (c)(1),
(2), (4) Date: Aug. 1, 2003

(87) PCT Pub. No.: WO03/028404

PCT Pub. Date: Apr. 3, 2003

(65) Prior Publication Data

US 2004/0037441 A1 Feb. 26, 2004

(30) Foreign Application Priority Data

| Sep. 26, 2001 | (JP) | 2001-293804 |
| Nov. 20, 2001 | (JP) | 2001-354499 |
| Feb. 20, 2002 | (JP) | 2002-43022 |
| Jul. 1, 2002 | (JP) | 2002-191900 |

(51) Int. Cl.
    *H04R 1/00* (2006.01)
(52) U.S. Cl. ............ 381/424; 381/423; 381/431
(58) Field of Classification Search ........ 381/150, 381/152, 182, 184, 345, 349, 350, 351, 396, 381/398, 423, 306, 333, 388, 347, 424, 431; 181/148, 164, 183, 155, 156, 163, 166; 455/90, 455/90.3, 550.1, 575.1, 566, 344, 350
See application file for complete search history.

(56) References Cited

U.S. PATENT DOCUMENTS

| 4,618,025 A * | 10/1986 | Sherman ............... 181/148 |
| 4,997,058 A * | 3/1991 | Bertagni ............... 181/166 |
| 5,394,478 A * | 2/1995 | Hathaway et al. ....... 381/86 |
| 6,176,345 B1 * | 1/2001 | Perkins et al. ......... 381/398 |
| 6,332,029 B1 * | 12/2001 | Azima et al. .......... 381/152 |
| 6,694,038 B1 * | 2/2004 | Azima ................. 381/423 |
| 2002/0061114 A1 * | 5/2002 | Croft, III ............ 381/345 |
| 2003/0003879 A1 * | 1/2003 | Saiki et al. ........... 455/90 |
| 2003/0059080 A1 * | 3/2003 | Backman .............. 381/407 |

FOREIGN PATENT DOCUMENTS

JP 55-135591 9/1980

(Continued)

*Primary Examiner*—Sinh Tran
*Assistant Examiner*—Brian Ensey
(74) *Attorney, Agent, or Firm*—Wenderoth, Lind & Ponack, L.L.P.

(57) ABSTRACT

A loudspeaker comprising an enclosure 31 provided with a second diaphragm disposed at an opening, and at least one sound generator 40 coupled acoustically with the enclosure. The sound generator is provided with a first diaphragm 27, wherein the second diaphragm has an area greater than an area of the first diaphragm. In the present invention, the shape of the enclosure, and the positioning and shape of the first and the second diaphragms can be designed at a designer's option. Thus a small-sized electronic apparatus can be obtained with a greater designing freedom, while a large-sized diaphragm prevents a decrease of generated sound pressure.

30 Claims, 14 Drawing Sheets

FOREIGN PATENT DOCUMENTS

| | | |
|---|---|---|
| JP | 56-160086 | 11/1981 |
| JP | 57-2790 | 1/1982 |
| JP | 57-41392 | 3/1982 |
| JP | 58-127779 | 8/1983 |
| JP | 62-186584 | 11/1987 |
| JP | 1-159487 | 11/1989 |
| JP | 3-34391 | 4/1991 |
| JP | 6-177809 | 6/1994 |

* cited by examiner

FIG. 20 – PRIOR ART
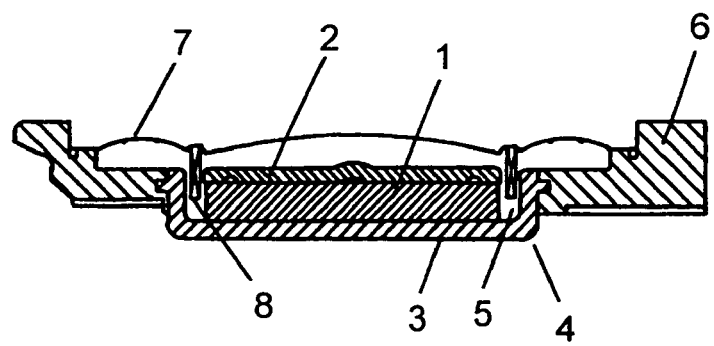
FIG. 21 – PRIOR ART
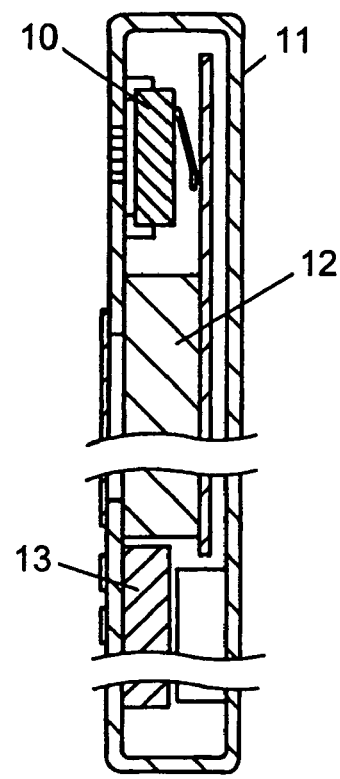

FIG. 22 – PRIOR ART
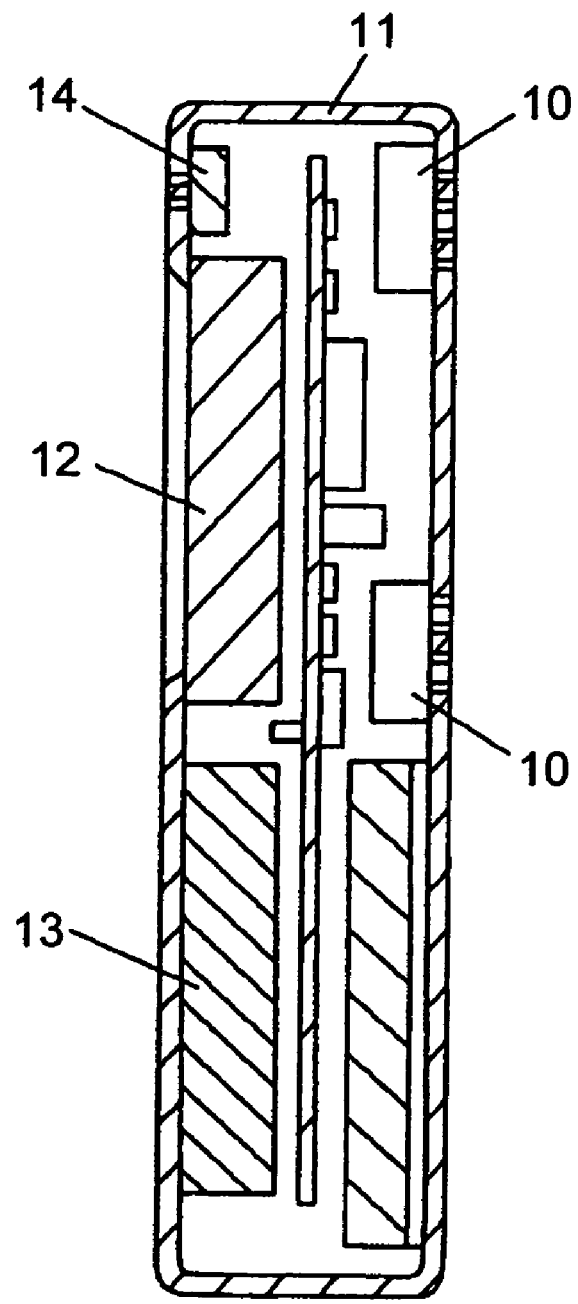

US 7,020,302 B2

SPEAKER, SPEAKER MODULE, AND ELECTRONIC EQUIPMENT USING THE SPEAKER MODULE

TECHNICAL FIELD

The present invention relates to a loudspeaker, a loudspeaker module using the loudspeaker and an electronic apparatus such as a portable telephone unit, a communication apparatus, a game unit or the like, using the loudspeaker or the loudspeaker module.

BACKGROUND ART

A conventional technology is described referring to FIGS. 20–22.

FIG. 20 is a cross sectional view of a conventional loudspeaker, FIG. 21 is a cross sectional view in part of a portable telephone unit showing a state where the loudspeaker is mounted therein.

Referring to FIG. 20, a magnetized magnet 1 is sandwiched by an upper plate 2 and a yoke 3 to form a magnetic circuit 4, and a frame 6 is connected to the yoke 3 of magnetic circuit 4. A diaphragm 7 coupled with a voice coil 8 is adhered and fixed on the circumference of frame 6 so that the voice coil 8 is inserted in a magnetic gap 5 of magnetic circuit 4.

FIGS. 21 and 22, respectively, show a state where a conventional loudspeaker 10 is mounted in a portable telephone unit. A display device 12 is disposed in the outer case 11 of portable telephone unit, and a loudspeaker 10 is disposed on a reverse surface of an outer case, or a surface opposite to the display device 12. An operation section 13 is disposed besides the display device 12. Furthermore, a receiver 14 is provided next to the display device 12.

In the recent requirements towards small-sized and multi-functioning of the portable telephone units and other electronic appliances, the loudspeaker 10 is also requested to be still more downsized, and to have a greater freedom in the mounting disposition. It is essential to make an area of the diaphragm 7 smaller if a loudspeaker 10 is to be downsized; however, a diaphragm 7 having a reduced area accompanies a problem of reduced sound pressure level.

Among the compact-sized portable telephone units, some are further requested to be compatible with stereo-phonic signals; then a telephone unit needs to be mounted with a plurality of loudspeakers 10. In such a case, the loudspeaker 10 is requested to become more compact.

The present invention addresses to provide a loudspeaker that contributes to a further downsizing of the electronic apparatus such as a portable telephone units and the like.

DISCLOSURE OF THE INVENTION

A loudspeaker of the present invention comprises an enclosure having a second diaphragm disposed at an open end, and at least one sound generator acoustically coupled with the enclosure. The sound generator is provided with a first diaphragm, and an area of the second diaphragm is greater than an area of the first diaphragm. Depending on needs, the second diaphragm is divided into portions and the divided portions are connected with a flexible material, and the thickness of the second diaphragm can be varied depending on a portion.

BRIEF DESCRIPTION OF THE DRAWINGS

FIG. 20 is a cross sectional view of a conventional loudspeaker.

FIG. 21 is a cross sectional view of a conventional portable telephone unit.

FIG. 22 is a cross sectional view of another conventional portable telephone unit.

BEST MODE FOR CARRYING OUT THE INVENTION

Now in the following, exemplary embodiments of the present invention will be described with reference to the drawings.

First Embodiment

Figure 1:
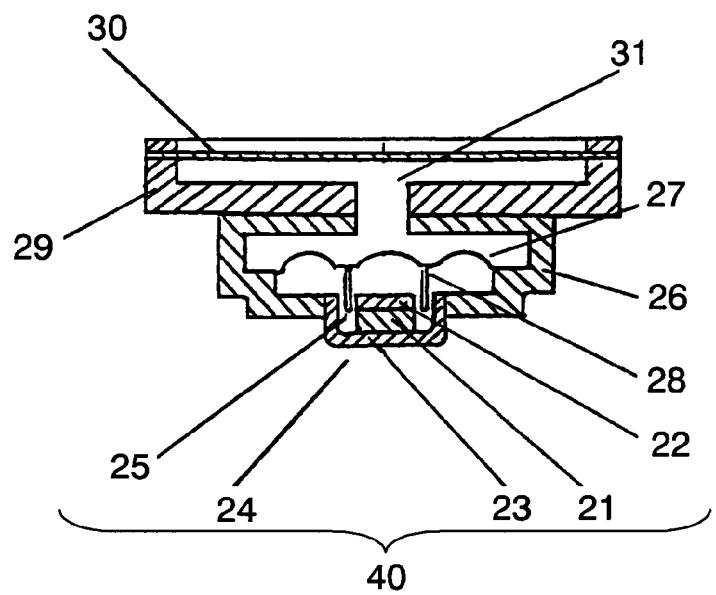
FIG. 1 is a cross sectional view of a loudspeaker in accordance with an exemplary embodiment of the present invention.

FIG. 1 shows a cross sectional view of a loudspeaker in accordance with an exemplary embodiment of the present invention.

A loudspeaker in the first exemplary embodiment comprises a box 29 provided at the opening with a substantially flat second diaphragm 30, and a sound generator 40.

The sound generator 40 comprises an inner magnet type magnetic circuit 24 with a magnetized magnet 21 sandwiched by an upper plate 22 and a yoke 23. A frame 26 is connected to the yoke 23 of magnetic circuit 24, a first diaphragm 27 is bonded to the circumference of the frame 26, and the first diaphragm 27 is coupled with a voice coil 28. The voice coil 28 is inserted in a magnetic gap 25 of the magnetic circuit 24.

A box 29 is connected to the circumference of the frame 26, and the box 29 is provided with a substantially flat second diaphragm 30 bonded to the opening of the box 29. The first diaphragm 27 and the second diaphragm 30 are acoustically coupled via an enclosure 31. Area of the second diaphragm 30 in the present embodiment is greater than that of the first diaphragm 27.

In a structure in accordance with the present invention, a shape of the enclosure 31 as well as positioning and a shape of the first and the second diaphragms can be designed at a designer's option. Thus a designer will have a greater designing freedom in producing a compact portable telephone unit, while evading a degradation in the sound pressure of reproduced sound with a use of a larger-sized diaphragm.

In the above description, the sound generator 40 is described based on a dynamic electro-acoustic transducer. However, the sound generator 40 is not limited to the dynamic electro-acoustic transducer; it can be an electro-static transducer or a piezoelectric transducer.

The second diaphragm 30 may have a thickness of 0.05–10 mm, depending on a total size of the apparatus. Thus a portable telephone unit or the like equipment can be designed to have a thinner profile.

A gap size underneath the second diaphragm 30 may be 0.01–10 mm. Thus a portable telephone unit or a larger equipment can be designed to provide a still thinner profile.

Although in the above description the box 29 and the frame 26 have been explained as discrete members, these components may be provided as an unitary body by a resin molding or the like processes. In this case, a finished sound generator provided in advance by coupling a diaphragm with a magnetic circuit 24, may be fit to the integrated resin body at a place corresponding to the frame.

Second Embodiment

Figure 2:
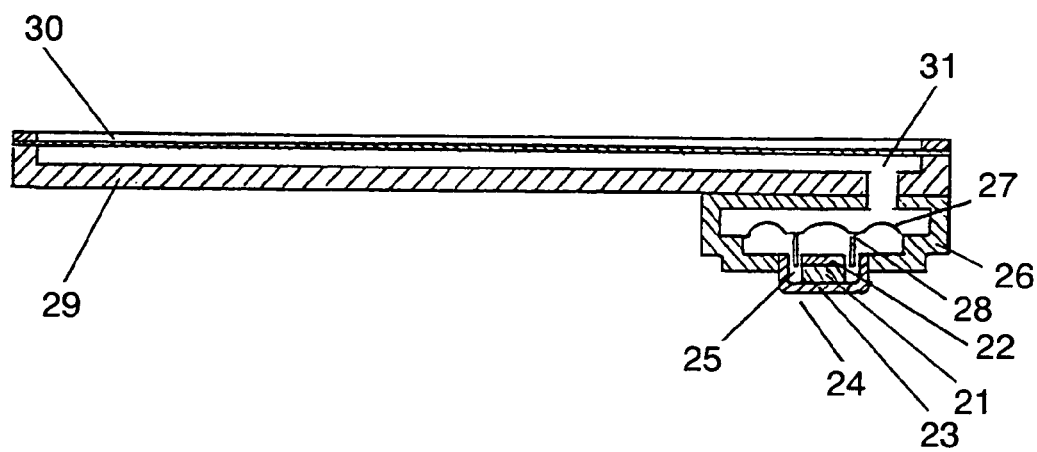
FIG. 2 is a cross sectional view of a loudspeaker in accordance with other exemplary embodiment of the present invention.

A loudspeaker in accordance with a second exemplary embodiment of the present invention is described referring to FIG. 2. The point of difference as compared with that in the first exemplary embodiment is that the frame 26 is disposed at an end portion of the box 29. In the above-described configuration in accordance with the present exemplary embodiment, the first diaphragm 27 can be disposed at a portion corresponding to an end part of the second diaphragm 30 by making use of the enclosure 31. Thus it provides a still larger designing freedom, and a portable telephone unit having a large second diaphragm 30 can be provided in a still reduced overall dimension.

Furthermore, according to the present exemplary embodiment, a specific area among the outer surfaces of an electronic apparatus can be utilized as the second diaphragm 30. Thus highly efficient designing of an electronic apparatus can be expected.

Third Embodiment

A loudspeaker in accordance with a third exemplary embodiment is described in the following. The point of difference as compared with the first exemplary embodiment is that the second diaphragm 30 and the box 29 in the present exemplary embodiment are made of a transparent material. As a result, according to the present embodiment, the second diaphragm 30 as well as the box 29 can be seen through to the their bottom or the back. When designing, for example, a portable telephone unit in the above-described configuration, a display device or the like components can be disposed at an efficient space factor. In other words, they can be disposed not only in the surface area next to a loudspeaker or second diaphragm 30, but they can be also disposed in a space behind the loudspeaker or the second diaphragm 30. Thus, a still larger designing freedom and a portable telephone unit having a large second diaphragm 30 can be obtained in a more compact contour.

Fourth Embodiment

Figure 3:
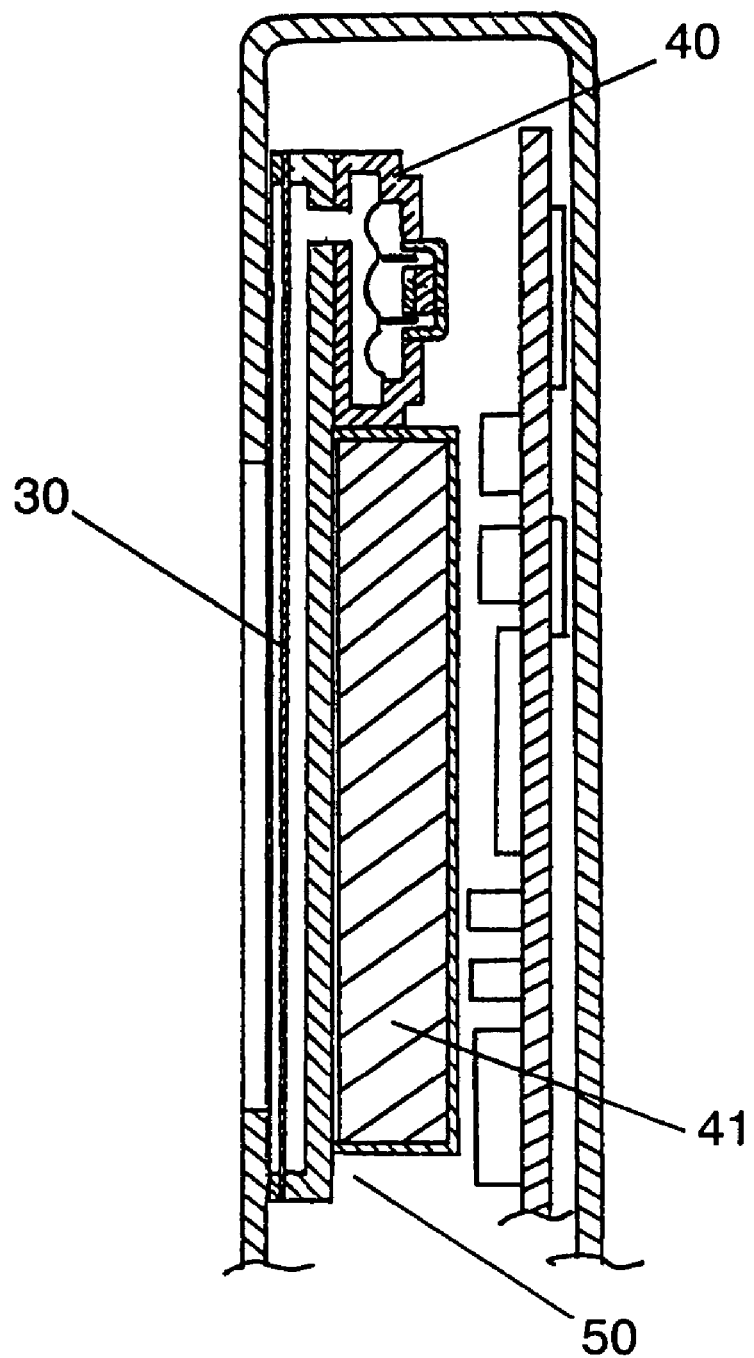
FIG. 3 is a cross sectional view of a portable telephone unit mounted with the loudspeaker of FIG. 2.

FIG. 3 is a partial cross sectional view of a portable telephone unit incorporating a loudspeaker provided in accordance with the second exemplary embodiment of the present invention.

Referring to FIG. 3, a module 50 comprising a display device 41 and a loudspeaker of the second embodiment is mounted in a portable telephone unit. A diaphragm 30 and a box 29 of the loudspeaker in the present embodiment are made of a transparent film and a transparent resin. In the present exemplary embodiment, a display device 41 is disposed in a space underneath the diaphragm 30 and the box to form an integrated module. The transparent diaphragm 30 and the transparent box 29 enable the present module. Thus, a still larger designing freedom and a portable telephone unit having a large second diaphragm 30 can be obtained in a more compact contour.

An integration of a loudspeaker and a display device into module leads to a reduced number of processing steps during production, and to an effective parts supply management. These eventually contribute to a cost reduction.

Fifth Embodiment

Figure 4:
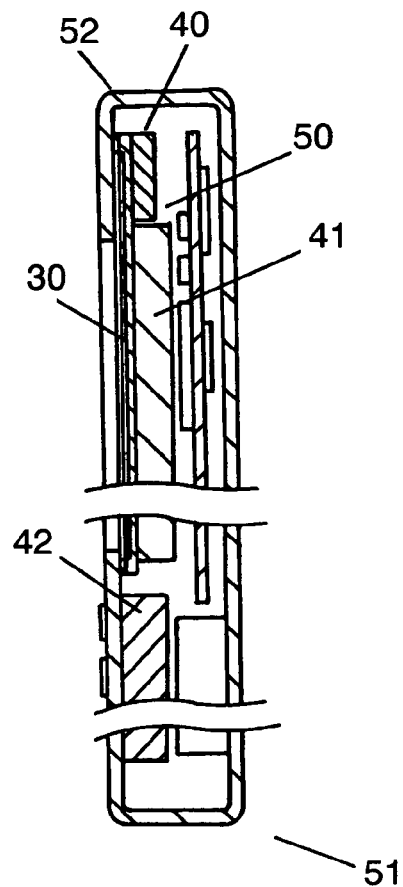
FIG. 4 is a cross sectional view of a portable telephone unit in accordance with an exemplary embodiment of the present invention.

A fifth exemplary embodiment is described with reference to FIG. 4. FIG. 4 is a partial cross sectional view of a portable telephone unit 51 incorporating a module 50 described the fourth exemplary embodiment.

Referring to FIG. 4, key portion of the portable telephone unit 51 comprises the module 50 and an operation section 42, both of them connected and housed in an outer case 52. Disposing the operation section 42 next to the module 50 enables downsizing of a portable telephone unit 51, and increases the designing freedom.

Furthermore, it is also possible to dispose both the display device 41 and the operation section 42 in a space underneath the transparent second diaphragm 30. Thus further downsizing and a larger designing freedom of a portable telephone unit 51 can be expected.

Although the above description in the present exemplary embodiment has been made based on a portable telephone unit, the concept can be applied to, besides portable telephone unit, various kinds of electronic apparatus such as every kinds of communication equipment, a game unit, a Liquid Crystal TV receiver, a personal computer, a navigation device, and the like.

Sixth Embodiment

Figure 5:
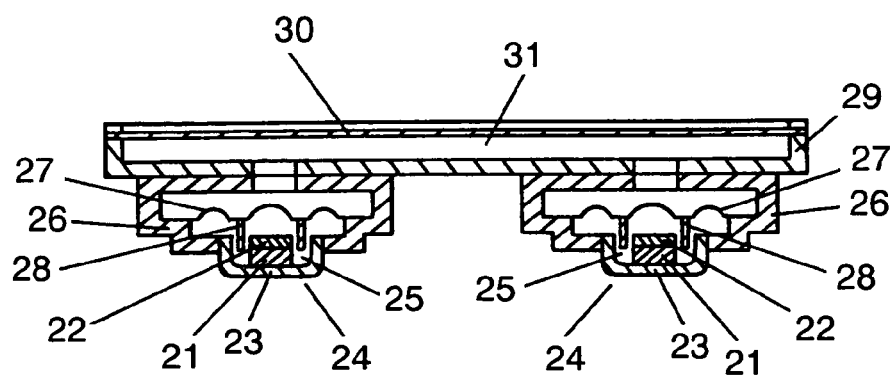
FIG. 5 is a cross sectional view of a loudspeaker in accordance with another embodiment of the present invention.

A loudspeaker in accordance with a sixth exemplary embodiment of the present invention is described referring to FIG. 5. In the present exemplary embodiment, two sound generators 40 are provided at both end portions of the box 29 (second diaphragm 30) of the second exemplary embodiment. The disposition of the two first diaphragms 27 in an opposing arrangement at both ends of the diaphragm 30 leads to a further downsizing of a portable telephone unit having a large-size diaphragm 30, and to a larger designing freedom.

Figure 6:
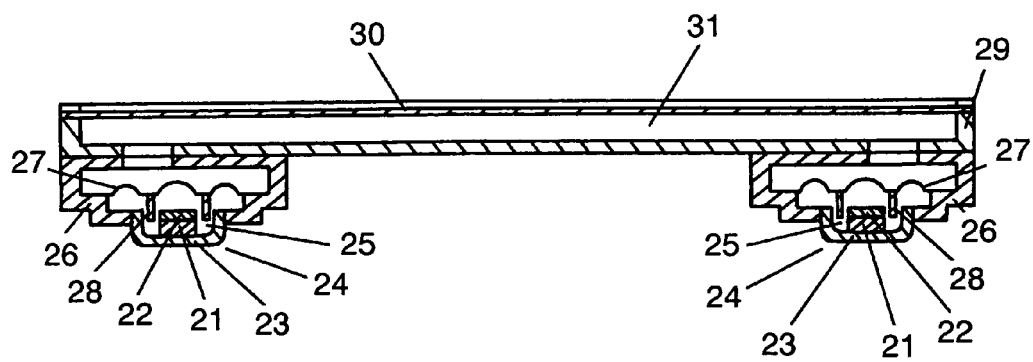
FIG. 6 is a cross sectional view of a loudspeaker in accordance with still another embodiment of the present invention.

Like in the third exemplary embodiment, the above configuration allows a designer a freedom to design a shape of the enclosure 31, where a shape and locations of the respective diaphragms can be designed at a designer's option. For example, when the sound generators 40 are disposed with a long distance between each other, as shown in FIG. 6, it effectively reduces cross talk between the right and the left channels in receiving stereophonic signals.

As is understood from the above description, area of the diaphragm 30 in the present preferred embodiment is greater than at least double the area of diaphragm 27 of the sound generator 40.

Thus the sound pressure of a loudspeaker is increased by the use of a large-sized diaphragm 30 and a plurality of sound generators 40. Since the space between the sound generators can be utilized by other components effectively, the compactness is not sacrificed and a loudspeaker can provide a great sound pressure in accordance with the present preferred embodiment.

The above explanation is made about an example using two sound generators, but the number of sound generator is not limited to two. For example, a diaphragm 30 may be provided with four sound generators disposed around, and one among a plurality of sound generators may be used for a buzzer, and many other modifications may be developed. When a plurality of sound generators are used, the size of individual sound generator can be reduced, which contributes to a further downsizing of an apparatus.

Seventh Embodiment

Figure 7:
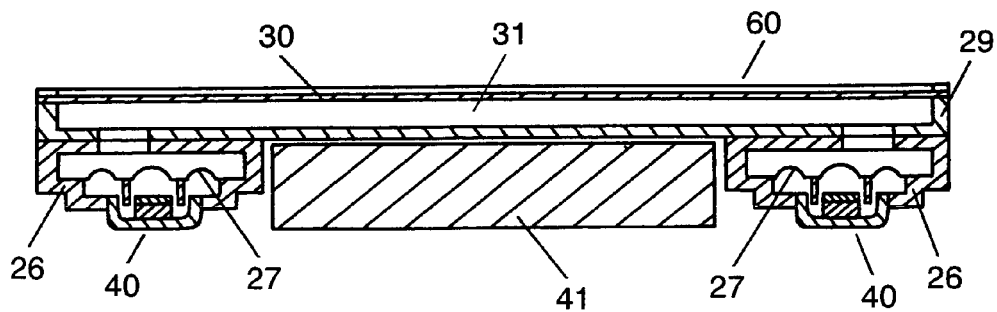
FIG. 7 is a cross sectional view of a module in which the loudspeaker of FIG. 6 and a display device are integrated.

A module in accordance with a seventh exemplary embodiment of the present invention is described with reference to FIG. 7. In the present exemplary embodiment, a loudspeaker in the sixth exemplary embodiment comprising a transparent second diaphragm 30 and a transparent box 29 is integrated with a display device 41 into a module 60. The diaphragm 30 is disposed in the front and covering the display device 41. The modular component is advantageous in reducing the number of process steps during assembly of an electronic apparatus and effective components supply management. This leads to a reduced cost.

Figure 8:
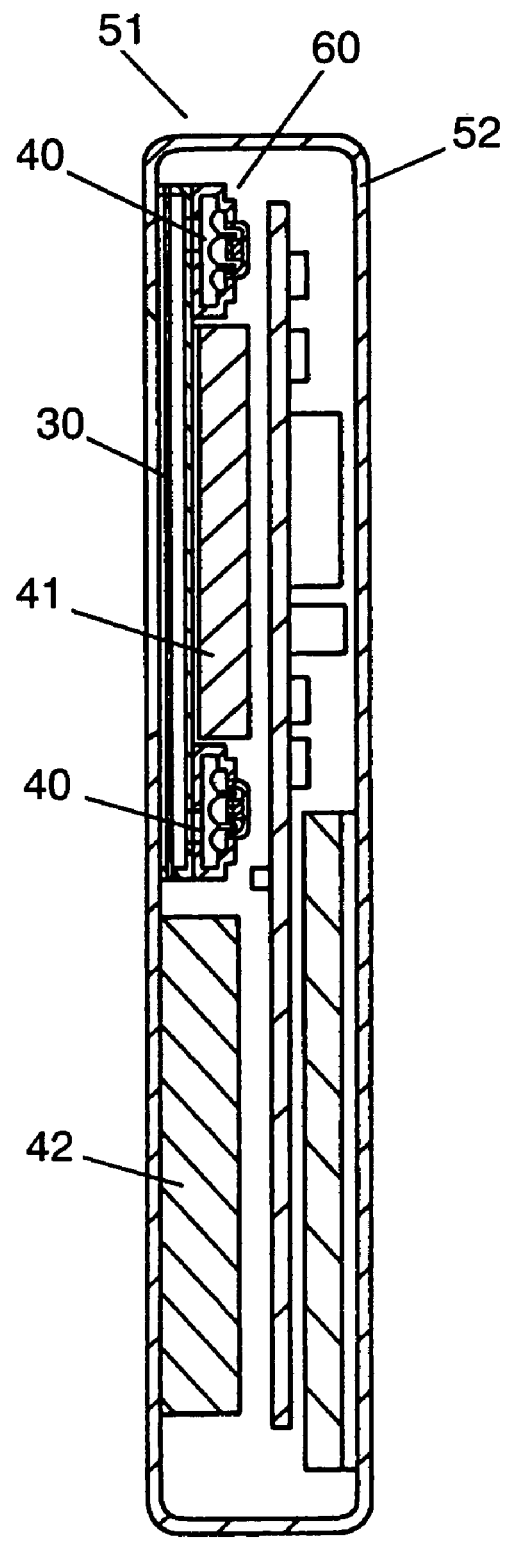
FIG. 8 is a cross sectional view of a portable telephone unit incorporating the module of FIG. 7.

The module 60 in the present preferred embodiment can be mounted in an outer case 52, as shown in FIG. 8, to produce a portable telephone unit 51. The portable telephone unit 51 comprises at least a module 60 and an operation section 42. The use of a module 60 contributes to reduce the overall size, to thin and to provide more designing freedom with the portable telephone unit 51.

A loudspeaker module 60 may be disposed in any layouts in accordance with a function and a design, such as in a lengthwise arrangement or in a lateral arrangement in the outer case 52 of portable telephone unit 51.

Furthermore, both of the display device 41 and the operation section 42 can be disposed in a space underneath the transparent diaphragm 30. This arrangement enables a further downsizing of a portable telephone unit 51 and provides a further increased designing freedom. The operation section 42 can be operated by giving a pressing force with a finger, for example, from above the transparent second diaphragm 30.

In a structure of the present embodiment, a diaphragm 30 can be shared by a receiver, which used to be provided independently. In this configuration, a receiver sound-hole which used to be an indispensable item can be eliminated to provide a remarkably improved waterproof or drip-proof property. In addition, a broad vibration area of the large-sized diaphragm provides a wider service area.

Although the above explanation has been made based on a portable telephone unit, the concept can be applied to, besides portable telephone unit, various kinds of electronic apparatus such as a communication equipment, a game unit, an LCD TV receiver, a personal computer, a navigation device and the like.

Eighth Embodiment

Figure 9:
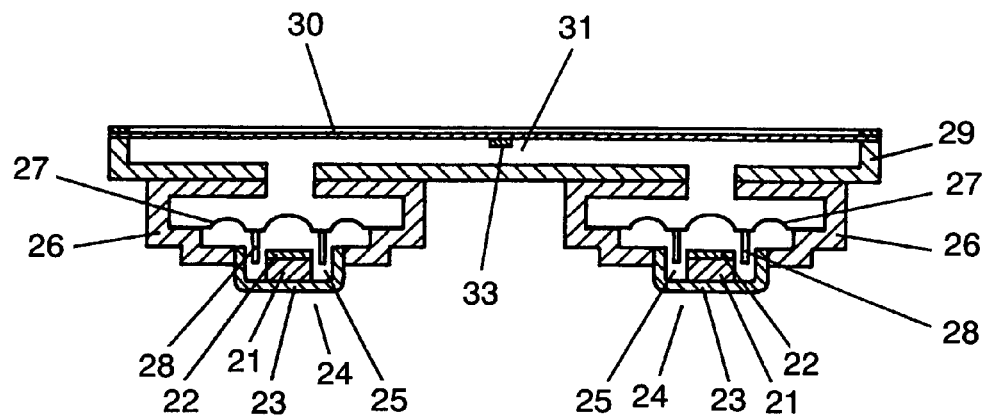
FIG. 9 is a cross sectional view of a loudspeaker in accordance with yet another embodiment of the present invention.

An eighth exemplary embodiment of the present invention is described with reference to FIG. 9. In FIG. 9, a second diaphragm 30 of the third exemplary embodiment is divided into two portions at substantially the middle, and two portions are connected with a flexible material 33. This configuration contributes to an improved channel separation at stereophonic sound reproduction.

Namely, with the diaphragm 30 of the embodiment 3, sounds generated from the two sound generators are sometimes mixed together causing a cross talk. This often affects the channel separation at stereophonic sound reproduction to a deteriorated stereophonic atmosphere. However, the second diaphragm 30 in accordance with the present exemplary embodiment, which is divided into two portions at substantially the middle, provides an improved channel separation during stereophonic sound reproduction.

As to the material 33 for dividing a diaphragm 30 into two portions, a silicone resin, a rubber, a thermoplastic elastomer, a foamed resin and the like may be used. Silicone resin has a superior waterproof property, and provides a stable channel separation during sound reproduction in stereo channel under a wide temperature range. Rubber materials provide a designer with a broad selection range in the flexibility. Thus, rubber is suitable when a critical adjustment of channel separation is requested. Thermoplastic elastomer is advantageous in high productivity and a reduced cost. Foamed resin has a great internal loss, which leads to a remarkable channel separation effect.

As described above, various kinds of effects can be generated by selecting a material for the flexible material 33.

Figure 10:
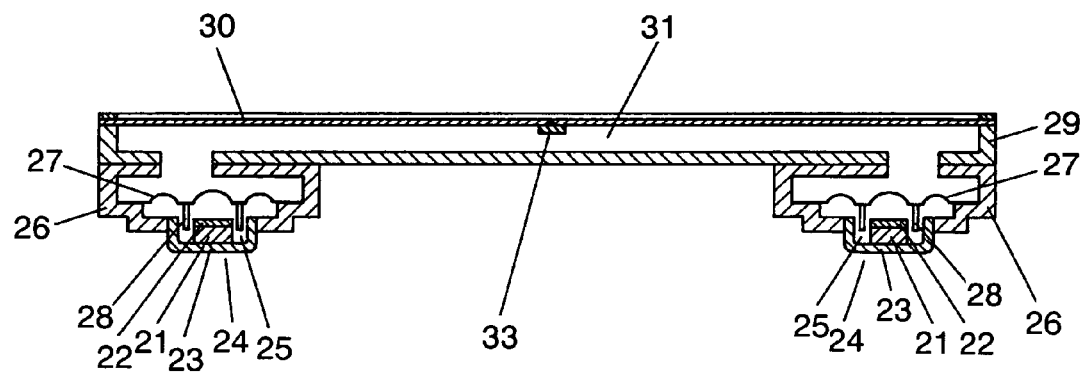
FIG. 10(a) is a cross sectional view of a loudspeaker in accordance with still other embodiment of the present invention.
FIG. 10(b) is a cross sectional magnified view showing a key portion of FIG. 10(a).
Figure 10:
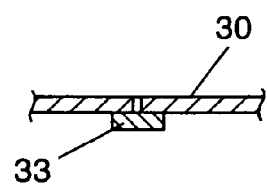

When the sound generators 40 are disposed with a large distance between each other as illustrated in FIG. 10, cross talk between the right and left channels can be further reduced to a still improved channel separation during stereo sound reproduction.

Figure 11:
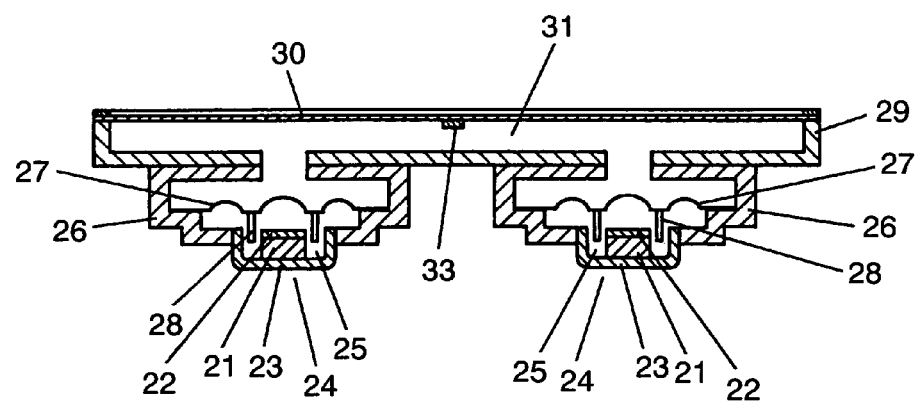
FIG. 11 is a cross sectional view of a loudspeaker in accordance with still other embodiment of the present invention.
Figure 12:
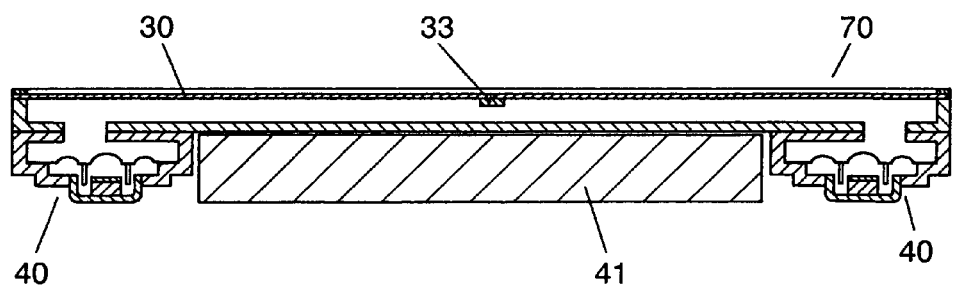
FIG. 12 is a cross sectional view of a module in which the loudspeaker of FIG. 10 and a display device are integrated.

When the sound generators 40 are disposed, as shown in FIG. 11, so that a center of each sound generator 40 coincides with a center of respective divided portions of diaphragm 30 divided at the middle, vibration of diaphragm 27 can be sent precisely to the corresponding right-left portions of the diaphragm 30. As a result, the unwanted resonance of diaphragm 30 is reduced, and a low distortion and a high-fidelity reproduction of the sound are performed. Although the above description has been made on a diaphragm 30 divided into two portions, a diaphragm may be divided into three or more portions and each of the portions may be provided at a center of an individual diaphragm 27 of the sound generators 40. Thus the concept can be applied to a diaphragm divided into an increased number of portions.

Furthermore, when a transparent material is used for the material 33 and the second diaphragm 30 is made of a transparent film, a display device 41 can be disposed underneath the diaphragm 30 without inviting visual hazard. Thus, the loudspeaker of the present exemplary embodiment and the display device 41 can be integrated into a module 70.

An integration of a loudspeaker and a display device into module contributes to reduce a number of process steps during the production, and to an effective parts supply management. These lead to a reduced cost.

Ninth Embodiment

A ninth exemplary embodiment of the present invention is described with reference to FIG. 13.

Figure 13:
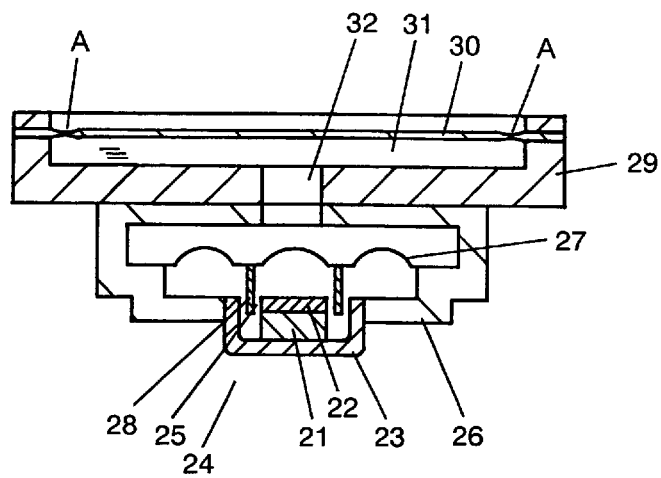
FIG. 13 is a cross sectional view of a loudspeaker in accordance with still other embodiment of the present invention.

FIG. 13 illustrates a loudspeaker of the first exemplary embodiment wherein a thickness of the second diaphragm 30 differs depending on a portion. A loudspeaker in the present embodiment has a diaphragm 30, which has a thin groove area A at an outer circumference. Vibration mode of the diaphragm 30 is adjustable by changing its partial thickness. Thus, the sound pressure/frequency characteristic and the distortion characteristic can be controlled to produce favorable characteristics.

Namely, the loudspeaker in the first exemplary embodiment has a difficulty in controlling the vibration mode of diaphragm 30 in some cases, and the frequency characteristics sometimes become unstable. With the structure of the present exemplary embodiment, however, the vibration mode can be controlled by changing partial thickness of the diaphragm 30. As a result, a compact loudspeaker yet having superior frequency characteristic and distortion characteristic is produced.

Figure 14:
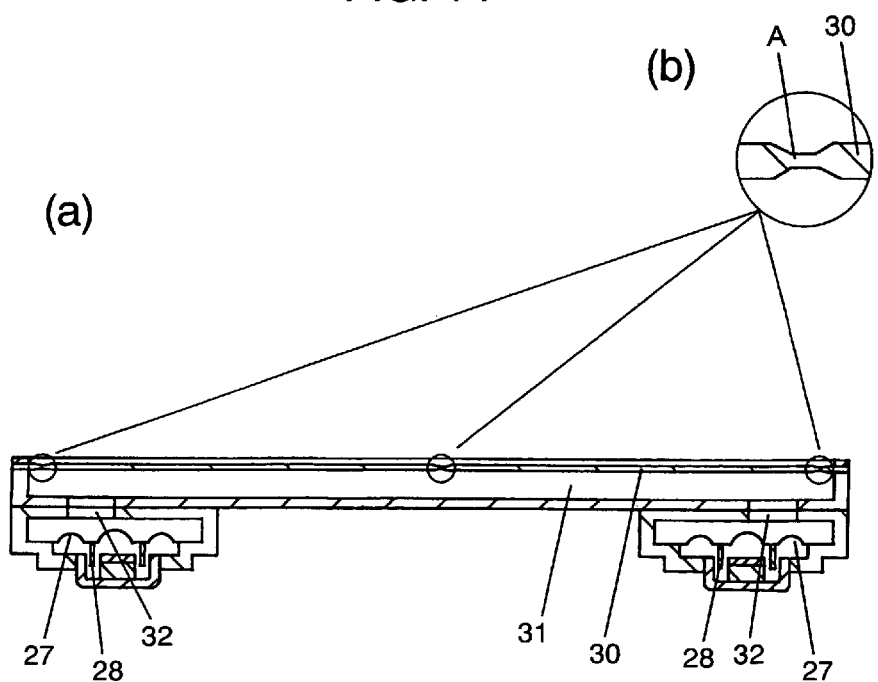
FIG. 14(a) is a cross sectional view of a loudspeaker in accordance with still other embodiment of the present invention.
FIG. 14(b) is a cross sectional magnified view showing a key portion of FIG. 14(a).

Also in the present exemplary embodiment, the channel separation at stereo sound reproduction can be improved by providing a long distance between the first diaphragms 27 disposed right and left as shown in FIG. 14(a).

Figure 15:
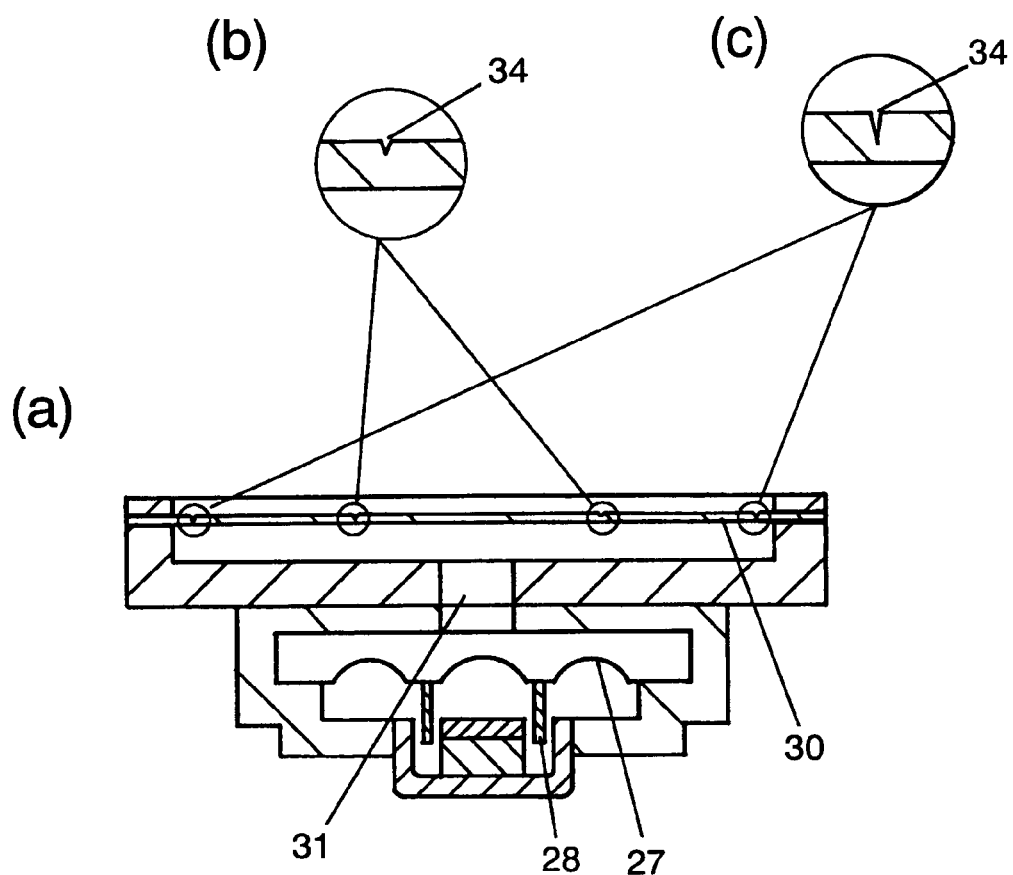
FIG. 15(a) is a cross sectional view of a loudspeaker in accordance with still other embodiment of the present invention.
FIG. 15(b) is a cross sectional magnified view showing key portions of FIG. 15(a).
FIG. 15(c) is a cross sectional magnified view showing key portions of FIG. 15(a).

The second diaphragm 30 may be further provided with grooves 34, as shown in FIG. 15. The grooves 34 suppress propagation of vibration to change the vibration mode. The frequency characteristic and the distortion characteristic can also be put under a finer control by making use of the grooves 34. The resultant effects include, a reduced unnecessary resonance of diaphragm 30, a lower distortion, a high fidelity sound reproduction, and so on, which integrally lead to further improved frequency characteristics.

It is preferred that the grooves 34 are carefully provided to halfway of the material thickness of diaphragm 30 in order not to introduce air leakage.

Figure 16:
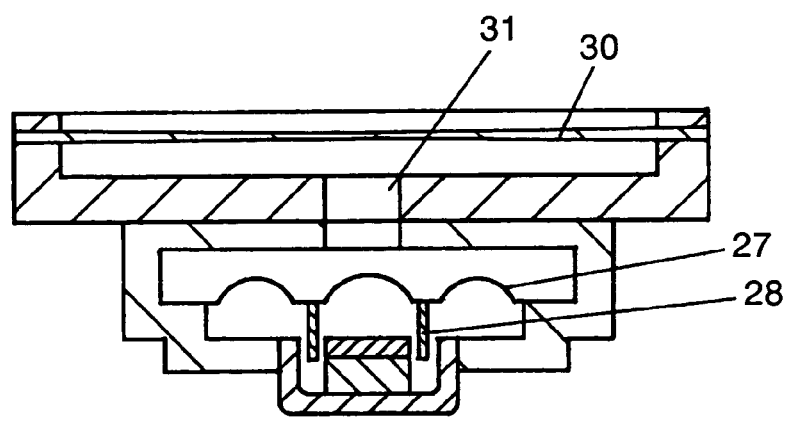
FIG. 16 is a cross sectional view of a loudspeaker in accordance with still other embodiment of the present invention.

Furthermore, the vibration mode of diaphragm 30 can be optimized by gradually increasing its thickness from a center to an outer periphery, as shown in FIG. 16. Namely, the thinned material thickness of diaphragm 30 at the central area and the vicinity reduces mass of the diaphragm, which improves the sound pressure level at high frequency range and extends the upper limiting frequency. The thickness in the intermediary region is kept normal, and that at the outer periphery is increased to optimize the total weight balance of the diaphragm to reproduce the sound favorably down to a low frequency range.

Figure 17:
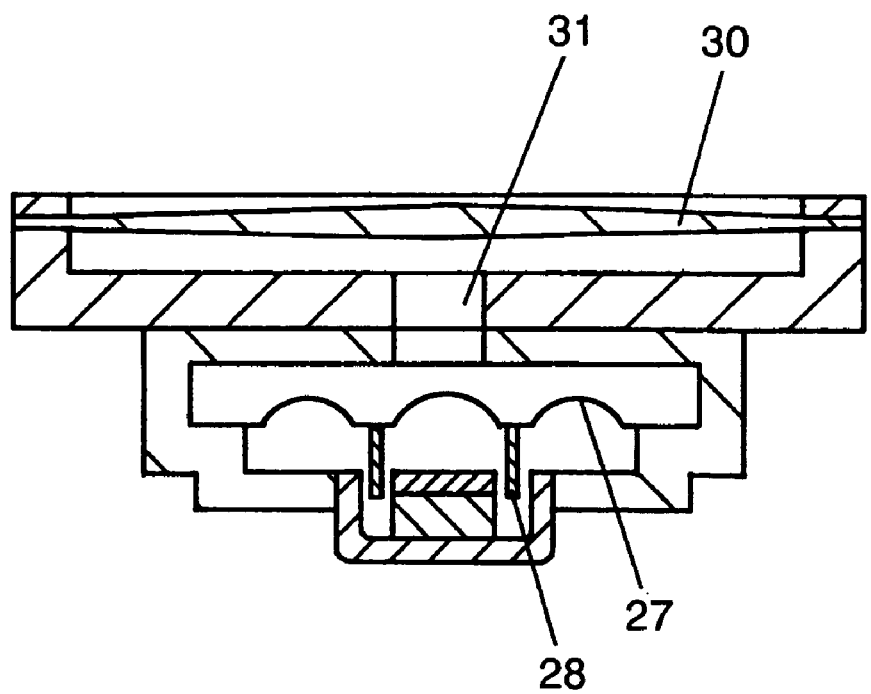
FIG. 17 is a cross sectional view of a loudspeaker in accordance with still other embodiment of the present invention.

Contrary to the above-described configuration, material thickness of the diaphragm 30 can be thinned gradually from the central area towards the outer periphery as shown in FIG. 17. The greater mass in the central area makes the vibration mode of a diaphragm 30 as that of a high-cut filter. Thus a sound of a middle- and high-frequency range are cut off and a heavy low sound can be reproduced.

Figure 18:
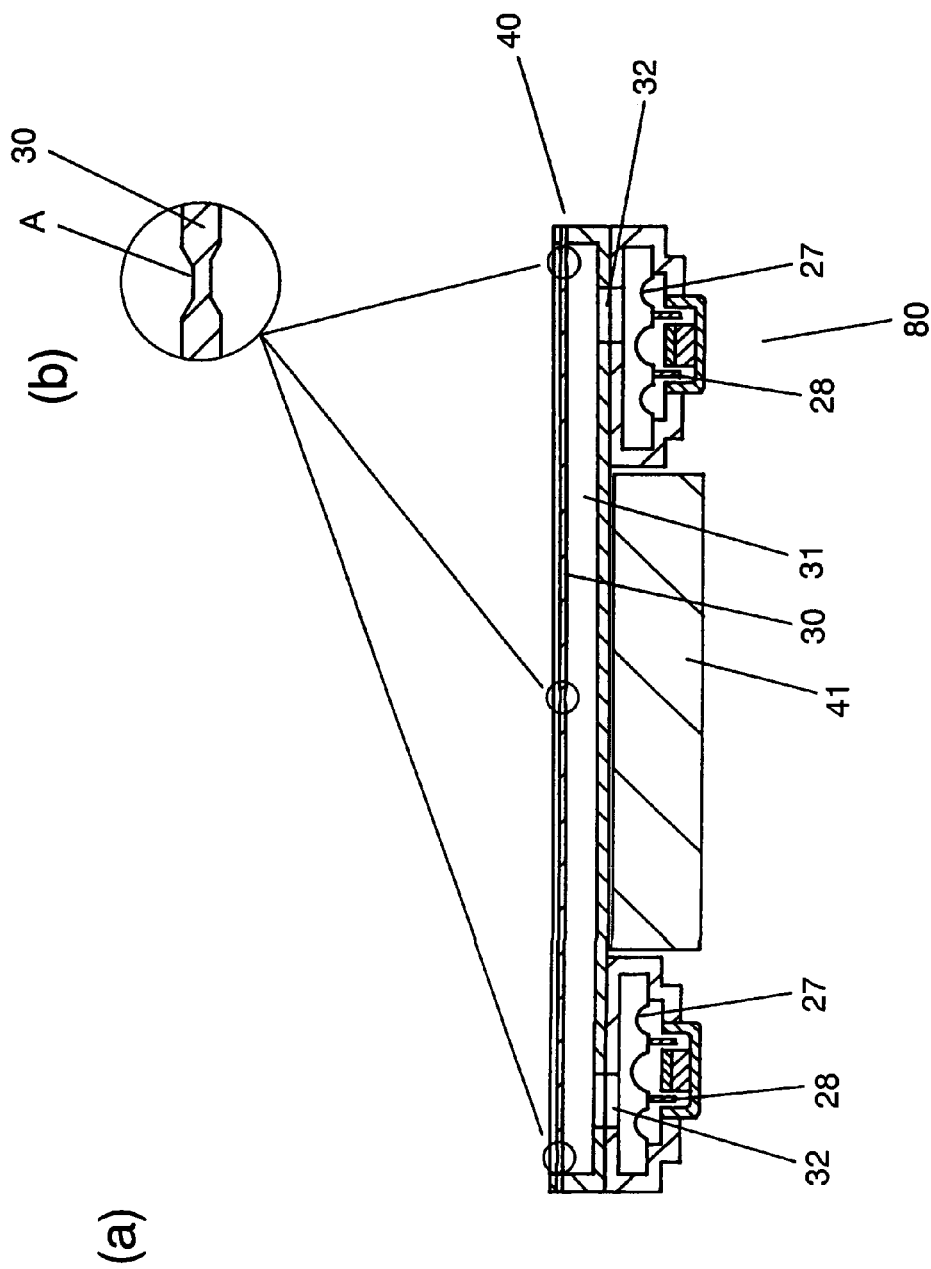
FIG. 18(a) is a cross sectional view of a module in accordance with an exemplary embodiment of the present invention.
FIG. 18(b) is a cross sectional magnified view showing key portions of FIG. 18(a).

Further, a display device 41 and a loudspeaker in the present embodiment can be integrated into a module 80, as shown in FIG. 18(a), in the same way as in the foregoing exemplary embodiments. This configuration provides a further downsizing and designing freedom with an electronic apparatus, as well as improved frequency characteristics. In a diaphragm 30 of FIG. 18(a), a thin groove areas A are provided as shown in FIG. 18(b), for controlling the frequency characteristics.

Figure 19:
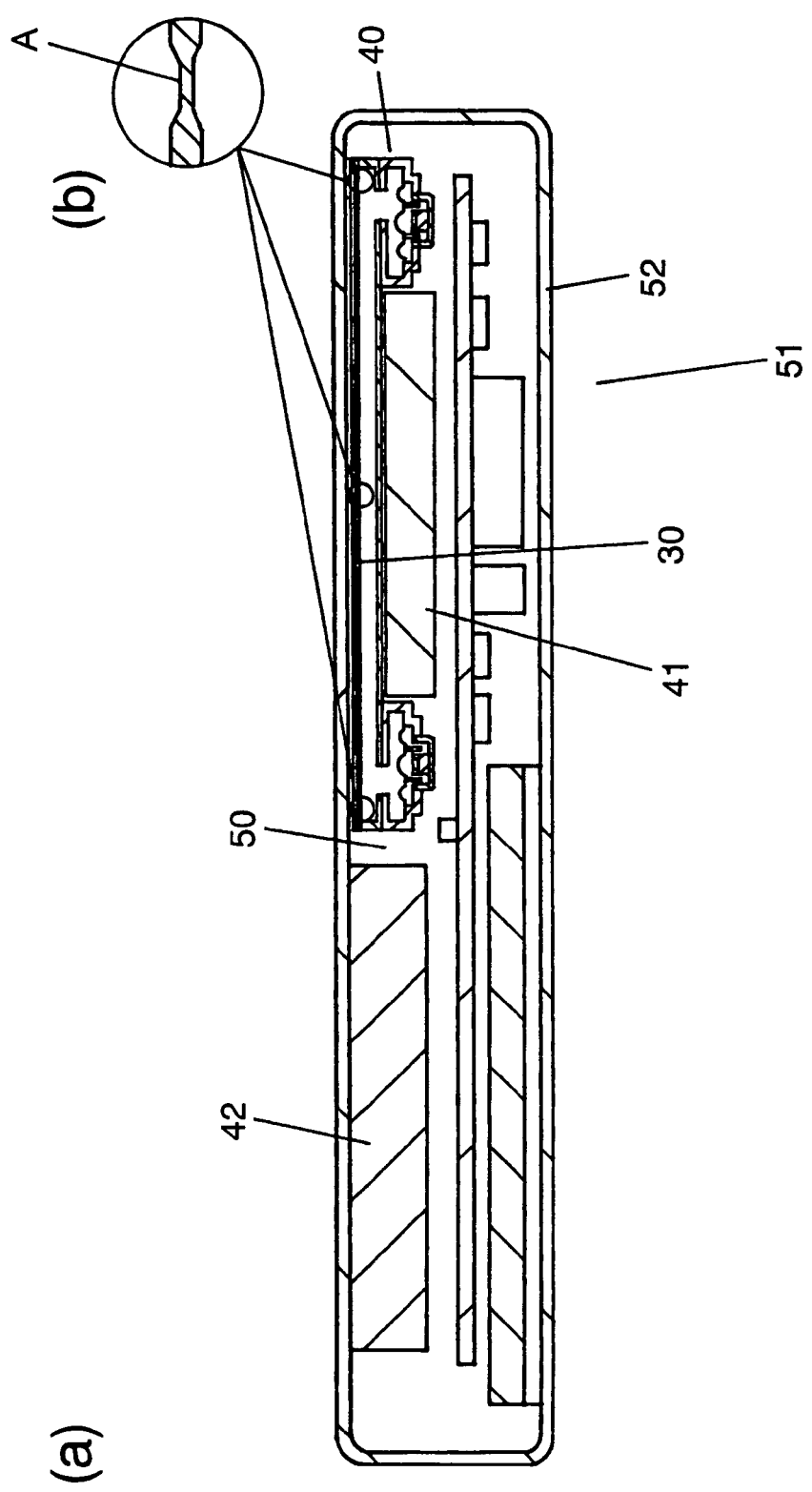
FIG. 19(a) is a cross sectional view of a portable telephone unit in accordance with an exemplary embodiment of the present invention.
FIG. 19(b) is a cross sectional magnified view showing key portions of FIG. 19(a).

The module 80 is built in a portable telephone unit or other electronic apparatus, as shown in FIG. 19. The module 80 enables to reduce the number of process steps during production and to simplify the parts supply management, while maintaining favorable frequency characteristics of an electronic apparatus. Thus, the module 80 eventually lead to a cost reduction.

INDUSTRIAL APPLICABILITY

A loudspeaker in the present invention comprises an enclosure having a second diaphragm disposed at an open end, and at least one sound generator coupled acoustically with the enclosure. The sound generator has a first diaphragm, and the second diaphragm is characterized in that it has a greater area than that of the first diaphragm. The present invention allows a free optimization of respective diaphragms in terms of the positioning and shape, and downsizes a loudspeaker module and a portable electronic apparatus. Furthermore, the present invention provides an improved channel separation at stereo sound reproduction by a compact apparatus.

The invention claimed is:

1. A loudspeaker comprising:
an enclosure having an opening;
at least one sound generator provided outside said enclosure, said at least one sound generator having a first diaphragm and being coupled acoustically with an interior of said enclosure; and
a second diaphragm disposed at said opening of said enclosure;
wherein said second diaphragm is divided along substantially a middle thereof into two portions, and said two portions of said second diaphragm are connected via flexible material; and
wherein said second diaphragm has an area greater than an area of said first diaphragm.

2. The loudspeaker of claim 1, wherein said sound generator is one selected from the group consisting of a dynamic electro-acoustic transducer, an electrostatic electro-acoustic transducer and a piezoelectric electro-acoustic transducer.

3. The loudspeaker of claim 1, wherein the area of said second diaphragm is not less than twice than the area of said first diaphragm.

4. The loudspeaker of claim 1, wherein a material thickness of said second diaphragm is 0.05–10 mm.

5. The loudspeaker of claim 1, wherein
said enclosure includes a first surface disposed opposite said second diaphragm such that a gap is formed between said second diaphragm and said first surface of said enclosure; and
said gap formed between said second diaphragm and said first surface of said enclosure has a size of 0.01–10 mm.

6. The loudspeaker of claim 1, wherein said first diaphragm is disposed at a portion corresponding to an end portion of said second diaphragm.

7. The loudspeaker of claim 1, wherein
said at least one sound generator comprises a frame; and
said enclosure and said frame of said sound generator constitute a unitary body.

8. The loudspeaker of claim 1, wherein said at least one sound generator is mounted to said enclosure.

9. The loudspeaker of claim 1, wherein said second diaphragm is mounted to said enclosure so as to cover said opening of said enclosure.

10. The loudspeaker of claim 1, wherein
said second diaphragm is formed of a transparent material; and
said enclosure is formed of a transparent material.

11. The loudspeaker of claim 10, wherein
said transparent material of said second diaphragm comprises a resin; and
said transparent material of said enclosure comprises a resin.

12. A loudspeaker comprising:
an enclosure having an opening;
at least one sound generator provided outside said enclosure, said at least one sound generator having a first diaphragm and being coupled acoustically with an interior of said enclosure; and
a second diaphragm disposed at said opening of said enclosure;
wherein said second diaphragm has an area greater than an area of said first diaphragm;
wherein said second diaphragm is divided into portions, said portions being connected via a flexible material; and
wherein said first diaphragm is disposed at substantially a center of respective divided portions of said second diaphragm.

13. A loudspeaker comprising:
an enclosure having an opening;
at least one sound generator provided outside said enclosure, said at least one sound generator having a first diaphragm and being coupled acoustically with an interior of said enclosure; and
a second diaphragm disposed at said opening of said enclosure;
wherein said second diaphragm has an area greater than an area of said first diaphragm;
wherein said second diaphragm is divided into portions, said portions being connected via a flexible material; and
wherein said flexible material is transparent.

14. A loudspeaker comprising:
an enclosure having an opening;
at least one sound generator provided outside said enclosure, said at least one sound generator having a first diaphragm and being coupled acoustically with an interior of said enclosure; and
a second diaphragm disposed at said opening of said enclosure;
wherein said second diaphragm has an area greater than an area of said first diaphragm;
wherein said second diaphragm is divided into portions, said portions being connected via a flexible material; and
wherein said flexible material is one selected from the group consisting of a silicone resin, a rubber, a thermoplastic elastomer and a foamed resin.

15. A module comprising:
an enclosure having a first surface and an opening provided opposite said first surface;
at least one sound generator provided outside said enclosure, said at least one sound generator having a first diaphragm and being coupled acoustically with an interior of said enclosure;
a second diaphragm disposed at said opening of said enclosure; and
a display device disposed along said first surface of said enclosure;
wherein said second diaphragm is divided into portions, said portions being connected via a flexible material.

16. The module of claim 15, wherein an area of said second diaphragm is greater than an area of said first diaphragm.

17. The module of claim 15, wherein
said at least one sound generator comprises a frame; and
said enclosure and said frame of said sound generator constitute a unitary body.

18. The module of claim 15, wherein
said at least one sound generator is secured to said enclosure; and
said display device is disposed outside said enclosure.

19. The module of claim 15, wherein said second diaphragm is mounted to said enclosure so as to cover said opening of said enclosure.

20. The module of claim 15, wherein
said second diaphragm is formed of a transparent material; and
said enclosure is formed of a transparent material.

21. The module of claim 20, wherein
said transparent material of said second diaphragm comprises a resin; and
said transparent material of said enclosure comprises a resin.

22. The module of claim 15, wherein
said second diaphragm is divided along substantially a middle thereof into two portions, said two portions being connected via said flexible material.

23. An electronic apparatus comprising:
an enclosure having a first surface and an opening provided opposite said first surface;
at least one sound generator provided outside said enclosure, said at least one sound generator having a first diaphragm and being coupled acoustically with an interior of said enclosure;
a second diaphragm disposed at said opening of said enclosure;
a display device disposed along said first surface of said enclosure; and
an operation section;
wherein said second diaphragm is divided into portions, said portions being connected via a flexible material.

24. The electronic apparatus of claim 23, wherein an area of said second diaphragm is greater than an area of said first diaphragm.

25. The electronic apparatus of claim 23, wherein
said at least one sound generator comprises a frame; and said enclosure and said frame of said sound generator constitute a unitary body.

26. The electronic apparatus of claim 23, wherein
said at least one sound generator is secured to said enclosure; and
said display device is disposed outside said enclosure.

27. The electronic apparatus of claim 23, wherein said second diaphragm is mounted to said enclosure so as to cover said opening of said enclosure.

28. The electronic apparatus of claim 23, wherein
said second diaphragm is formed of a transparent material; and
said enclosure is formed of a transparent material.

29. The electronic apparatus of claim 28, wherein
said transparent material of said second diaphragm comprises a resin; and
said transparent material of said enclosure comprises a resin.

30. The electronic apparatus of claim 23, wherein
said second diaphragm is divided along substantially a middle thereof into two portions, said two portions being connected via said flexible material.

* * * * *